(12) United States Patent
Ma et al.

(10) Patent No.: US 12,326,206 B2
(45) Date of Patent: Jun. 10, 2025

(54) CABLE HOLDER, MAGNETIC RING FIXING DEVICE, AND AIR CONDITIONER OUTDOOR UNIT

(71) Applicants: Qingdao Haier Air Conditioner General Corp., Ltd., Shandong (CN); Qingdao Haier Air-conditioning Electronic Co., Ltd., Shandong (CN); Haier Smart Home Co., Ltd., Shandong (CN)

(72) Inventors: Zhenhao Ma, Qingdao (CN); Junyan Zhang, Qingdao (CN); Huan Yang, Qingdao (CN); Jianke Li, Qingdao (CN); Zhilin Zhao, Qingdao (CN)

(73) Assignees: QINGDAO HAIER AIR CONDITIONER GENERAL CORP., LTD., Qingdao (CN); QINGDAO HAIER AIR-CONDITIONING ELECTRONIC CO., LTD., Qingdao (CN); HAIER SMART HOME CO., LTD., Qingdao (CN)

( * ) Notice: Subject to any disclaimer, the term of this patent is extended or adjusted under 35 U.S.C. 154(b) by 133 days.

(21) Appl. No.: 18/252,375

(22) PCT Filed: Nov. 2, 2021

(86) PCT No.: PCT/CN2021/128041
§ 371 (c)(1),
(2) Date: May 10, 2023

(87) PCT Pub. No.: WO2022/100477
PCT Pub. Date: May 19, 2022

(65) Prior Publication Data
US 2023/0407994 A1    Dec. 21, 2023

(30) Foreign Application Priority Data
Nov. 10, 2020 (CN) .......................... 202011250941.2

(51) Int. Cl.
*F16L 3/06* (2006.01)
*F24F 1/22* (2011.01)

(52) U.S. Cl.
CPC . *F16L 3/06* (2013.01); *F24F 1/22* (2013.01)

(58) Field of Classification Search
CPC ..................................... F16L 3/06; F24F 1/22
See application file for complete search history.

(56) References Cited

U.S. PATENT DOCUMENTS

2019/0217681 A1* 7/2019 Lin .................... B60H 1/00521

FOREIGN PATENT DOCUMENTS

| CN | 103379810 A | * 10/2013 |
|----|-------------|-----------|
| CN | 104853556 A | * 8/2015 |

(Continued)

OTHER PUBLICATIONS

Blueridge air conditioner Model No. BM12M22CNS installation manual, published date May 20, 2020 (Year: 2020).*

(Continued)

*Primary Examiner* — Terrell L McKinnon
*Assistant Examiner* — Ding Y Tan
(74) *Attorney, Agent, or Firm* — Maier & Maier, PLLC

(57) ABSTRACT

A cable holder, a magnetic ring fixing device, and an air conditioner outdoor unit. The cable holder includes a holder body; cable grooves running through a side of the holder body are provided in the holder body; two side groove walls of each cable groove are respectively connected to first clamping arms towards the bottom of the groove at an opening; the distance between the two first clamping arms gradually decreases from the opening of each cable groove to the bottom of the groove; a fixing groove for matching a cable is provided at the bottom of each cable groove. Thus, cables can be conveniently placed in the cable grooves, and the cables cannot easily pass out of the cable grooves;

(Continued)

moreover, by arranging the fixing grooves, the cables can be fixed and limited, offset movement of the cables can be reduced, and an anti-falling effect can be better realized.

8 Claims, 3 Drawing Sheets

(56) References Cited

FOREIGN PATENT DOCUMENTS

| CN | 108901192 A | * | 11/2018 | ........... H05K 9/0098 |
|---|---|---|---|---|
| CN | 109489131 A | * | 3/2019 | ................ F24F 1/22 |
| CN | 208657262 U | * | 3/2019 | ........... H05K 9/0098 |
| CN | 209434798 U | | 9/2019 | |
| CN | 111306648 A | * | 6/2020 | |
| CN | 211625501 U | * | 10/2020 | |
| CN | 112254226 A | | 1/2021 | |
| CN | 213777942 U | | 7/2021 | |
| FR | 2683885 A1 | | 5/1993 | |
| JP | 2011096628 A | | 5/2011 | |

OTHER PUBLICATIONS

International Search Report dated Jan. 30, 2022, in corresponding International Application No. PCT/CN2021/128041, 8 pages.

* cited by examiner

CABLE HOLDER, MAGNETIC RING FIXING DEVICE, AND AIR CONDITIONER OUTDOOR UNIT

CROSS-REFERENCE TO RELATED APPLICATIONS

The present application claims priority to Chinese patent application No. 202011250941.2, titled "CABLE HOLDER, MAGNETIC RING FIXING DEVICE, AND AIR CONDITIONER OUTDOOR UNIT", filed on Nov. 10, 2020, the entire disclosure of which is incorporated herein by reference.

FIELD

The present application relates to the technical field of electrical devices, and in particular to a cable bracket, a magnetic ring fixing device, and an air conditioner outdoor unit.

BACKGROUND

In controller components of an air conditioner outdoor unit, due to changes in power signals, there are many harmonic waves and interference signals in the circuit, which not only endanger the external power grid, but also affect normal operation of the circuit, making it difficult for the air conditioner to work properly. In view of this problem, on one hand, power cables are wound around a magnetic ring, so that interference signals can be filtered out and signal reliability can be improved; on the other hand, the magnetic ring is fixed inside an electrical box. Although the power cables are wound around the magnetic ring in the above solution, they are not reliably fixed, so the power cables may touch other electronic components.

Currently, a buckle in the form of hook is generally designed to fix an outgoing wire of the magnetic ring to prevent it from falling off; moreover, the buckle in the form of hook generally has a larger opening for easy installation of the cable. This leads to the problem of easy falling off of the outgoing wire of the existing magnetic ring when fixing the outgoing wire of the magnetic ring.

SUMMARY

Embodiments of the present application provide a cable bracket, a magnetic ring fixing device, and an air conditioner outdoor unit, so as to solve or partially solve the problem of easy falling off of the outgoing wire of the existing magnetic ring when fixing the outgoing wire of the magnetic ring.

An embodiment of the present application provides a cable bracket, which includes a bracket body; the bracket body is provided with a cable slot running through a side edge of the bracket body, and slot walls on both sides of the cable slot are respectively connected with a first clamp arm toward a slot bottom at an opening; a spacing between the two first clamp arms gradually decreases from the opening of the cable slot to the slot bottom, and a fixing slot for matching with a cable is provided on the slot bottom of the cable slot.

On the basis of the above solution, a guide slot with a size larger than a size of the cable is formed between at least one of the first clamp arms and the slot wall on a corresponding side of the cable slot.

On the basis of the above solution, bottoms of the two first clamp arms are respectively connected with a second clamp arm, and bottoms of the second clamp arms are inclined toward the slot walls on the corresponding sides of the cable slot.

On the basis of the above solution, a minimum distance between the bottom of the second clamp arm and the slot wall on the corresponding side of the cable slot is larger than a distance between the bottoms of the two first clamp arms and smaller than an outer diameter of the cable.

On the basis of the above solution, the slot walls on both sides of the cable slot are inclined respectively, and a spacing between the slot walls on both sides gradually decreases from the opening of the cable slot to the slot bottom.

An embodiment of the present application also provides a magnetic ring fixing device, which includes the cable bracket described above, and further includes a magnetic ring slot for matching with a magnetic ring; the bracket body of the cable bracket is arranged at one end of the magnetic ring slot.

On the basis of the above solution, a slot bottom of the magnetic ring slot is provided with an opening.

On the basis of the above solution, an end face of the magnetic ring slot that faces the bracket body is provided with an L-shaped incoming wire slot.

On the basis of the above solution, a plurality of the magnetic ring slots are connected side by side, and the plurality of magnetic ring slots have the same or different sizes.

An embodiment of the present application also provides an air conditioner outdoor unit, which includes the magnetic ring fixing device described above, and further includes an electrical box; the magnetic ring fixing device is connected to the electrical box.

In the cable bracket, the magnetic ring fixing device and the air conditioner outdoor unit provided by the embodiments of the present application, the arrangement of the first clamp arms enables the cable to be easily placed into the cable slot, and the cable will not be easily threaded out of the cable slot, thus achieving the effect of anti-falling off; moreover, the arrangement of the fixing slot enables the cable to be fixed and limited, which can reduce an offset movement of the cable to a certain extent, and which is advantageous for better achieving the effect of anti-falling off.

BRIEF DESCRIPTION OF DRAWINGS

In order to provide a clearer explanation of the technical solutions in the embodiments of the present application or in the prior art, a brief introduction will be given to the accompanying drawings required to be used in the description of the embodiments or the prior art. Obviously, the accompanying drawings in the following description illustrate some of the embodiments of the present application. For those skilled in the art, other drawings can also be obtained based on these drawings without creative efforts.

DETAILED DESCRIPTION

In order to make the objects, technical solutions and advantages of the embodiments of the present application clearer, a clear and complete description of the technical solutions in the embodiments of the present application will be provided below in connection with the accompanying drawings in the embodiments of the present application. Obviously, the described embodiments are some of the embodiments of the present application, not all of them. Based on the embodiments in the present application, all other embodiments obtained by those skilled in the art without creative efforts will fall within the scope of protection of the present application.

Figure 1:
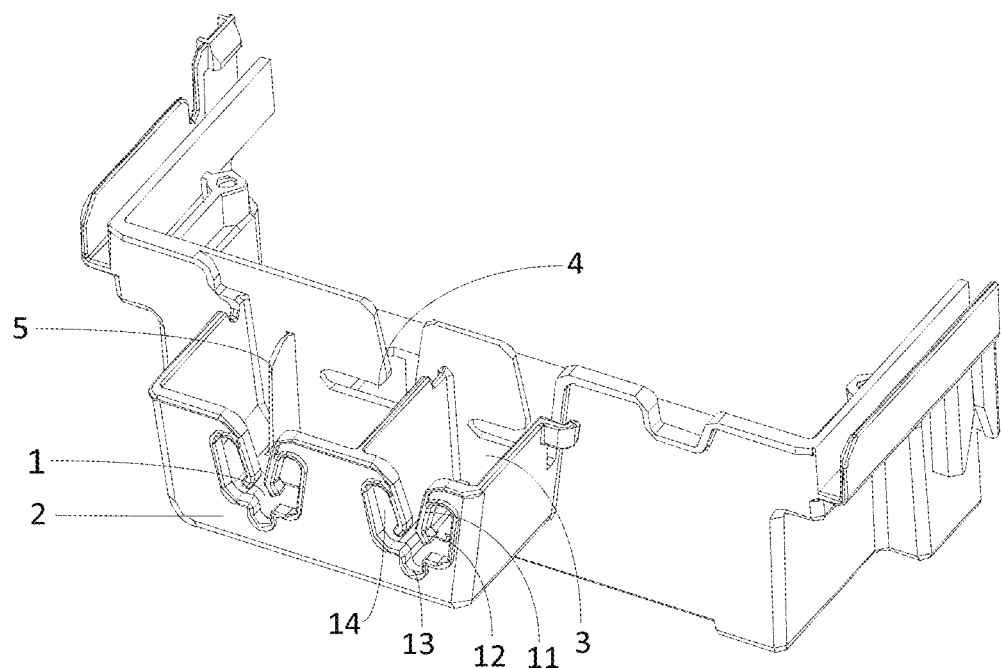
FIG. 1 is a schematic structural view of a cable bracket provided by an embodiment of the present application.

Referring to FIG. 1, an embodiment of the present application provides a cable bracket. The cable bracket includes a bracket body 2, on which a cable slot 1 is provided. The cable slot 1 runs through one side edge of the bracket body 2, so that the cable slot 1 is penetrating on this side edge of the bracket body 2, and this side edge of the bracket body 2 is a cable inlet. Slot walls on both sides of the cable slot 1 are respectively connected with a first clamp arm 11 toward a slot bottom at an opening; that is, the first clamp arms 11 are arranged toward the slot bottom of the cable slot 1. A spacing between the two first clamp arms 11 gradually decreases from the opening of the cable slot 1 to the slot bottom; that is, the first clamp arms 11 are inclined toward the middle, so that the two first clamp arms 11 have an inverted "A" shape as a whole, and the two first clamp arms 11 form a space tapering from top to bottom. The two first clamp arms 11 form a first claw structure as a whole, which is used to facilitate the insertion of the cable and make it not easy for the cable to be threaded out. The slot bottom of the cable slot 1 is provided with a fixing slot 13 for matching with the cable. The fixing slot 13 is communicated with the cable slot 1. A size of the fixing slot 13 matches with the cable, so that the cable can be fitted and placed in the fixing slot 13, thus fixing and limiting the cable.

In the cable bracket provided by the present embodiment, the arrangement of the first clamp arms 11 enables the cable to be easily placed into the cable slot 1, and the cable will not be easily threaded out of the cable slot 1, thus achieving the effect of anti-falling off; moreover, the arrangement of the fixing slot 13 enables the cable to be fixed and limited, which can reduce an offset movement of the cable to a certain extent, and which is advantageous for better achieving the effect of anti-falling off.

Further, a minimum distance between the two first clamp arms 11 should be smaller than an outer diameter of the cable. The first clamp arms 11 have an elastic deformation amount, which facilitates smooth insertion of the cable into the cable slot 1. The bracket body 2 and the first clamp arms 11 can be plastic parts.

On the basis of the above embodiment, further, a guide slot 14 with a size larger than the size of the cable is formed between at least one of the first clamp arms 11 and the slot wall on a corresponding side of the cable slot 1. That is, the cable can be placed in a space formed by the first clamp arm 11 and the slot wall on the corresponding side. The slot wall on the corresponding side is the slot wall of the cable slot 1 on a side where the first clamp arm 11 is connected.

Figure 2:
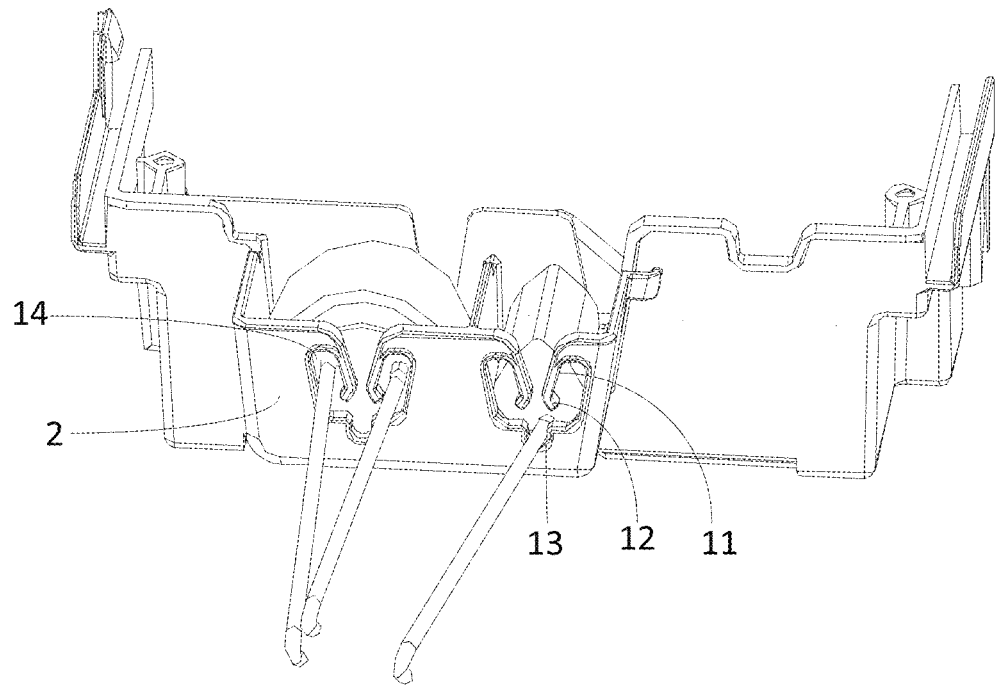
FIG. 2 is a schematic view of a position of cable in the cable bracket provided by the embodiment of the present application.

Referring to FIG. 2, this arrangement allows the cable to preferentially enter the guide slot 14 when popping out of the fixing slot 13 due to factors such as elasticity, deformation, or vibration, since the distance between the two first clamp arms 11 is relatively small and the space between at least one of the first clamp arms 11 and the slot wall on the corresponding side is relatively large. The guide slot 14 is closed from above, so that it is more difficult for the cable to detach from the cable slot 1, thus better achieving the effect of anti-falling off.

On the basis of the above embodiment, further, bottoms of the two first clamp arms 11 are respectively connected with a second clamp arm 12, and bottoms of the second clamp arms 12 are inclined toward the slot walls on the corresponding sides of the cable slot 1. That is, the two second clamp arms 12 are arranged downward and facing away from each other, and a spacing between the two second clamp arms 12 gradually increases from top to bottom. The two second clamp arms 12 have an "A" shape as a whole, and the two second clamp arms 12 form a second claw structure. The arrangement of the second clamp arms 12 can limit the size of an inlet of the guide slot 14. When the cable enters the guide slot 14, the second clamp arm 12 can prevent the cable from detaching from the guide slot 14, making it difficult for the cable to detach from the guide slot 14 and less likely to fall off the cable bracket, thus improving the effect of anti-falling off.

On the basis of the above embodiment, further, the bottom of the second clamp arm 12 is an end of the second clamp arm 12 that faces the slot bottom of the cable slot 1. The inlet of the guide slot 14 is formed between the bottom of the second clamp arm 12 and the slot wall on the corresponding side of the cable slot 1. The distance between the bottoms of the two first clamp arms 11 is the closest distance between the two first clamp arms 11, and this distance is the inlet of the entire cable bracket. The minimum distance between the bottom of the second clamp arm 12 and the slot wall on the corresponding side of the cable slot 1 is set to be larger than the distance between the bottoms of the two first clamp arms 11 and smaller than the outer diameter of the cable.

Firstly, the inlet size of the guide slot 14 and the overall inlet size of the cable slot 1 are both smaller than the outer diameter of the cable, meaning that when the cable has entered the guide slot 14 or has not entered the guide slot 14, the cable will not easily fall off; secondly, the inlet size of the guide slot 14 is larger than the overall inlet size of the cable slot 1, so that when the cable detaches from the fixing slot 13 under vibration and other conditions, it will preferentially enter the guide slot 14 instead of detaching from the cable slot 1, thus ensuring the effect of anti-falling off.

Herein, the slot wall on the corresponding side refers to the slot wall connected to the second clamp arm 12. The inlet size of the guide slot 14 is larger than the overall inlet size of the cable slot 1 and smaller than the outer diameter of the cable. Further, the minimum distance between the bottom of the second clamp arm 12 and the slot wall on the corresponding side of the cable slot 1 is a horizontal spacing between the bottom of the second clamp arm 12 and the slot wall on the corresponding side of the cable slot 1.

Further, a vertical distance between the bottom of the second clamp arm 12 and the slot bottom of the cable slot 1 is set to be larger than the outer diameter of the cable. In this way, when the cable detaches from the fixing slot 13, it is easier for the cable to move toward both sides, thereby overcoming an elasticity of the second clamp arm 12 under the action of elastic or inertial forces, and then entering the guide slot 14. The slot bottom of the cable slot 1 is an upper surface of the fixing slot 13.

On the basis of the above embodiment, further, the slot walls on both sides of the cable slot 1 are inclined respectively, and the spacing between the slot walls on both sides gradually decreases from the opening of the cable slot 1 to the slot bottom. That is, the slot walls on both sides of the cable slot 1 are inclined outward from the slot bottom and facing away from each other, so that the guide slot 14 is inclined, which facilitates the entry of the cable into the guide slot 14, thus better guiding the cable into a space where the cable is less prone to falling off, and ensuring the effect of anti-falling off.

On the basis of the above embodiment, further, the connection position between the first clamp arm 11 and the slot wall of the cable slot 1, and the connection position between the slot wall of the fixing slot 13 and the slot bottom of the cable slot 1 are set as a rounded structure respectively. Specifically, an inner side of the connection position between the first clamp arm 11 and the slot wall of the cable slot 1 is of a rounded structure; that is, the top of the guide slot 14 is curved and smooth, which is advantageous for improving the stability of the cable in the guide slot 14. The connection position between the slot wall of the fixing slot 13 and the slot bottom of the cable slot 1, i.e., the opening of the fixing slot 13, is set as a rounded structure, which facilitates the entry of the cable into the guide slot 14 and avoids damage to the cable during movement.

Further, an outer side of the connection position between the first clamp arm 11 and the slot wall of the cable slot 1, the connection position between the first clamp arm 11 and the second clamp arm 12, and the connection position between the slot wall and the slot bottom of the cable slot 1 can be set as a rounded structure respectively, which improves the smoothness of the movement path of the cable and avoid damage to the cable.

Figure 3:
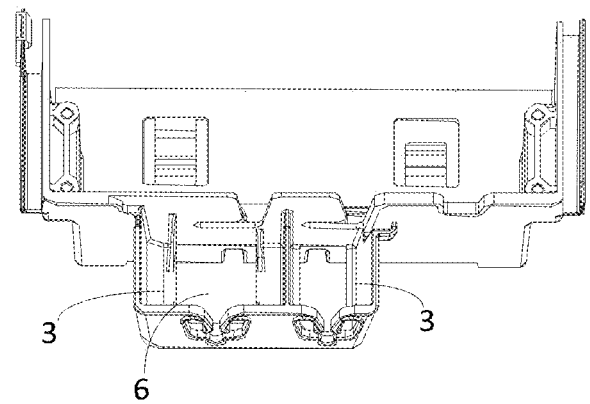
FIG. 3 is a schematic view of a magnetic ring slot provided by an embodiment of the present application from a first perspective.

On the basis of the above embodiment, further, referring to FIG. 3, the present embodiment provides a magnetic ring fixing device, which includes the cable bracket as described in any of the above embodiments. The magnetic ring fixing device further includes a magnetic ring slot 3 for matching with a magnetic ring, and the bracket body 2 of the cable bracket is arranged at one end of the magnetic ring slot 3. The magnetic ring slot 3 is used to place and fix the magnetic ring. The shape and size of the magnetic ring slot 3 match with the corresponding magnetic ring, so that the magnetic ring can be well fixed and is not easy to move. In the present embodiment, the cable bracket provided by the above embodiment is applied in the magnetic ring fixing device. The cable bracket is arranged at one end of the magnetic ring slot 3 to fix an outgoing wire of the magnetic ring, so that the outgoing wire of the magnetic ring can be well prevented from falling off.

On the basis of the above embodiment, further, the slot bottom of the magnetic ring slot 3 is provided with an opening 6. Since a surface of the magnetic ring is generally not flat, and is mostly an arc-shaped face, setting the opening 6 at the slot bottom of the magnetic ring slot 3 enables an outer portion of the magnetic ring to partially protrude out of the opening 6, so that the magnetic ring can be well fixed and a gap between the surface of the magnetic ring and the slot bottom in case of no opening 6 provided at the slot bottom is avoided, which is advantageous for saving space.

Figure 5:
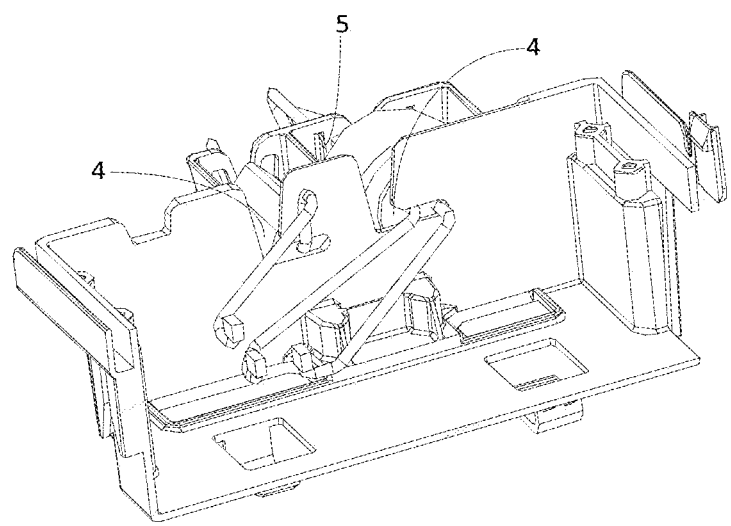
FIG. 5 is a schematic view of placement of a magnetic ring in the magnetic ring slot provided by the embodiment of the present application.

Referring to FIG. 5, an inner wall of the magnetic ring slot 3 is connected with a limit structure 5 for limiting and fixing the magnetic ring. The limit structure 5 can be a limit rib, a limit boss, etc., which is used to fix the magnetic ring against the surface of the magnetic ring. Specifically, the specific arrangement position and number of the limit structure 5 on the inner wall of the magnetic ring slot 3 are not limited, as long as the magnetic ring can be well fixed.

Further, the shape of inner sides of the bottom of the slot walls on both sides of the magnetic ring slot 3 matches with the shape of the magnetic ring, both being arc-shaped, so as to better fix the magnetic ring.

Figure 4:
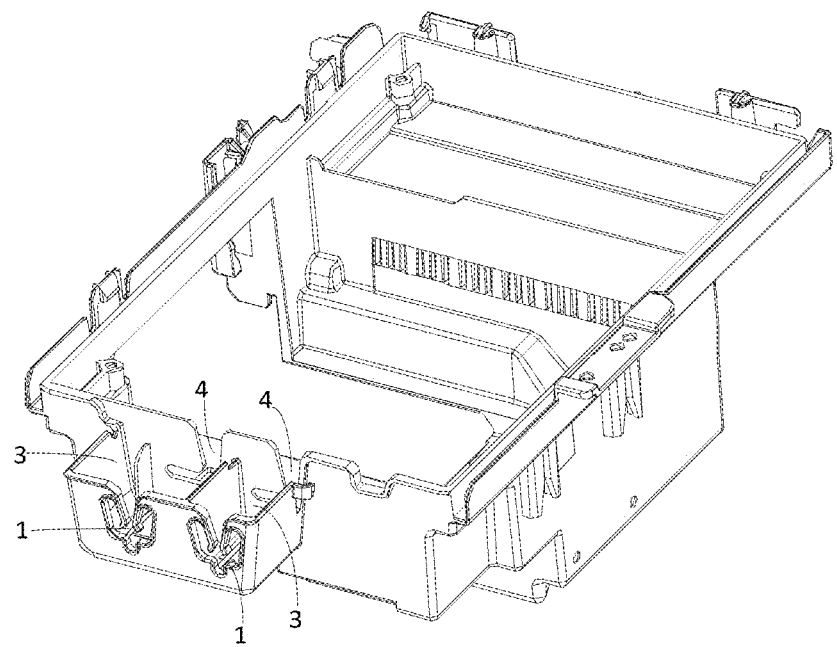
FIG. 4 is a schematic view of the magnetic ring slot provided by an embodiment of the present application from a second perspective.

On the basis of the above embodiment, further, referring to FIG. 4, an end face of the magnetic ring slot 3 that faces the bracket body 2 is provided with an L-shaped incoming wire slot 4. The L-shaped incoming wire slot 4 includes a vertical section and a horizontal section that are communicated, and the vertical section runs through the end face of the magnetic ring slot 3 that faces the bracket body 2 from above. Therefore, an incoming wire of the magnetic ring can enter from the vertical section and then enter the horizontal section for fixing and anti-falling off. Preferably, a width of the vertical section gradually decreases from top to bottom. That is, the vertical section is wider at the opening, which facilitates the smooth entry of the incoming wire of the magnetic ring.

On the basis of the above embodiment, further, a plurality of magnetic ring slots 3 are connected side by side, and the plurality of magnetic ring slots 3 have the same or different sizes. Since there is usually more than one magnetic ring in the electrical box, a corresponding number of magnetic ring slots 3 can be set as actually required. The magnetic ring slots 3 correspond to and match with the magnetic rings one on one. Further, the plurality of magnetic ring slots 3 can have the same length and the same or different widths. The length of the magnetic ring slot 3 refers to a distance between the end face on which the cable bracket is arranged and the end face on which the L-shaped incoming wire slot 4 is arranged; and the width refers to a distance between two slot walls. By setting the plurality of magnetic ring slots 3 with the same length, the magnetic rings with different sizes can be matched by setting different widths of the magnetic ring slots 3, so that the magnetic ring slots 3 can adapt to the magnetic rings with different sizes. Additionally, the plurality of magnetic ring slots 3 are arranged in an orderly manner, with incoming and outgoing wires neatly arranged and not easily disordered. Further, the plurality of magnetic ring slots 3 can be connected side by side on an installation plate, so that the magnetic rings are orderly arranged, and can be fixed at desired positions through the installation plate.

On the basis of the above embodiment, further, the present embodiment provides an air conditioner outdoor unit, which includes the magnetic ring fixing device as described in any of the above embodiments. The air conditioner outdoor unit further includes an electrical box, and the magnetic ring fixing device is connected to the electrical box.

Further, referring to FIG. 4, the installation plate of the magnetic ring can serve as a side wall of the electrical box and can be integrally formed with the electrical box. The specific installation position and application environment of the magnetic ring slot 3 are not limited, and the magnetic ring slot 3 can be used in any environment where the magnetic ring is required, not limited to the electrical box and air conditioner.

On the basis of the above embodiment, further, the present embodiment provides a magnetic ring fixing device to solve the problem that a magnetic ring wire bundle easily detaches from the claw when fixing the magnetic ring on a computer board of the air conditioner outdoor unit. In the existing computer boards with magnetic rings, wires may easily fall off the buckles due to the very thick and hard outgoing wires of the magnetic rings. The general buckles are designed in the form of a hook to prevent the wires from falling off, but the hook also makes it difficult to install the wires. The present embodiment adopts claws having "A" shapes that are symmetrical up-and-down, so that the wires can be easily installed and will not easily fall off with the aid of the structural design of the guide slot 14.

The magnetic ring fixing device mainly includes the magnetic ring slot 3 and the cable bracket arranged on one end face of the magnetic ring slot 3. An incoming wire slot is arranged at the end face of the inlet of the magnetic ring slot 3. The incoming wire slot is L-shaped, and a slot opening thereof has an inverted "A" shape to facilitate sliding in of the wire. The state of the wire after sliding in is shown in FIG. 5. In the cable bracket provided by the present embodiment, through the claws having "A" shapes that are symmetrical up-and-down and in cooperation with the structural design of the guide slot 14 and the fixing slot 13, the wires can be easily installed and will not easily fall off. The two claws are symmetrically arranged to gradually reduce the opening from top to bottom, and after the opening is reduced to be slightly smaller than the diameter of the wire (such as 1-1.5 mm smaller), it then gradually expands. In this way, when the wire is clamped in, the wire will push away the claws under the elasticity of the claws when it is clamped at the smallest-opening position, and then falls into the fixing slot 13, as shown by the claws of the magnetic ring slot 3 on the right side of FIG. 2. When the wire pops out of the fixing slot 13 due to factors such as elasticity, deformation and vibration, it will enter the guide slot 14 along the edge of the guide slot 14. The upper end of the guide slot 14 is closed, so that the wire will not pop out, as shown by the slot of the magnetic ring slot 3 on the left side of FIG. 2.

The cable bracket includes claw structures having symmetrical " /\ " shapes (i.e., the first claw structure formed by the first clamp arms 11 and the second claw structure formed by the second clamp arms 12), and the structure of the cable slot 1 formed by a combination of the fixing slot 13, the guide slot 14 and the claws having symmetrical " /\ " shapes. In addition, the magnetic ring fixing device designed by using the L-shaped incoming wire slot as the inlet of the magnetic ring slot 3 and using the above cable slot 1 as the outlet of the magnetic ring slot 3 can effectively achieve the effect of anti-falling off.

Further, the present embodiment provides an electrical box, in which corresponding magnetic ring slots 3 can be set according to the number of the magnetic rings on the computer board. The present embodiment makes the wires be easily clamped in and not easily fall off when fixing the wires by the electrical box, effectively avoiding circuit faults caused by the wires falling off the claws.

Finally, it should be noted that the above embodiments are only used to illustrate the technical solutions of the present application, not to limit them. Although the present application has been described in detail with reference to the above embodiments, it should be understood by those skilled in the art that they can still modify the technical solutions recorded in the above embodiments or equivalently replace some of the technical features. These modifications or replacements will not make the essence of the corresponding technical solutions depart from the spirit and scope of the technical solutions in various embodiments of the present application.

What is claimed is:

1. A cable bracket, comprising: a bracket body; wherein the bracket body is provided with a cable slot running through a side edge of the bracket body, and slot walls on both sides of the cable slot are respectively connected with a first clamp arm toward a slot bottom at an opening; a spacing between the two first clamp arms gradually decreases from the opening of the cable slot to the slot bottom, and a fixing slot for matching with a cable is provided on the slot bottom of the cable slot and is a recess formed in the slot bottom;
   wherein bottoms of the two first clamp arms are respectively connected with a second clamp arm, and bottoms of the second clamp arms are inclined toward the slot walls on the corresponding sides of the cable slot;
   wherein a guide slot with a size larger than a size of the cable is formed between at least one of the first clamp arms and the slot wall on a corresponding side of the cable slot, and the guide slot is closed from above and has an inlet facing downwards;
   wherein the inlet of the guide slot is formed between the bottom of the second clamp arm and the slot wall on the corresponding side of the cable slot; and
   wherein the inlet size of the guide slot is larger than the overall inlet size of the cable slot so that when the cable detaches from the fixing slot under vibration and other conditions, it will enter the guide slot instead of detaching from the cable slot.

2. The cable bracket according to claim 1, wherein a minimum distance between the bottom of the second clamp arm and the slot wall on the corresponding side of the cable slot is larger than a distance between the bottoms of the two first clamp arms and smaller than an outer diameter of the cable.

3. The cable bracket according to claim 1, wherein the slot walls on both sides of the cable slot are inclined respectively, and a spacing between the slot walls on both sides gradually decreases from the opening of the cable slot to the slot bottom.

4. A magnetic ring fixing device, comprising the cable bracket according to claim 1, and further comprising a magnetic ring slot for matching with a magnetic ring; the bracket body of the cable bracket being arranged at one end of the magnetic ring slot.

5. The magnetic ring fixing device according to claim 4, wherein a slot bottom of the magnetic ring slot is provided with an opening.

6. The magnetic ring fixing device according to claim 4, wherein an end face of the magnetic ring slot that faces the bracket body is provided with an L-shaped incoming wire slot.

7. The magnetic ring fixing device according to claim 4, wherein a plurality of the magnetic ring slots is connected side by side, and the plurality of magnetic ring slots have the same or different sizes.

8. An air conditioner outdoor unit, comprising the magnetic ring fixing device according to claim 4, and further comprising an electrical box; the magnetic ring fixing device being connected to the electrical box.

\* \* \* \* \*